(No Model.) 3 Sheets—Sheet 1.
F. G. SARGENT.
CONE DUSTER FOR FIBROUS SUBSTANCES.
No. 400,953. Patented Apr. 9, 1889.
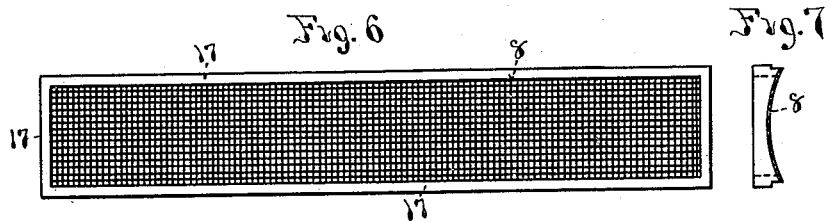
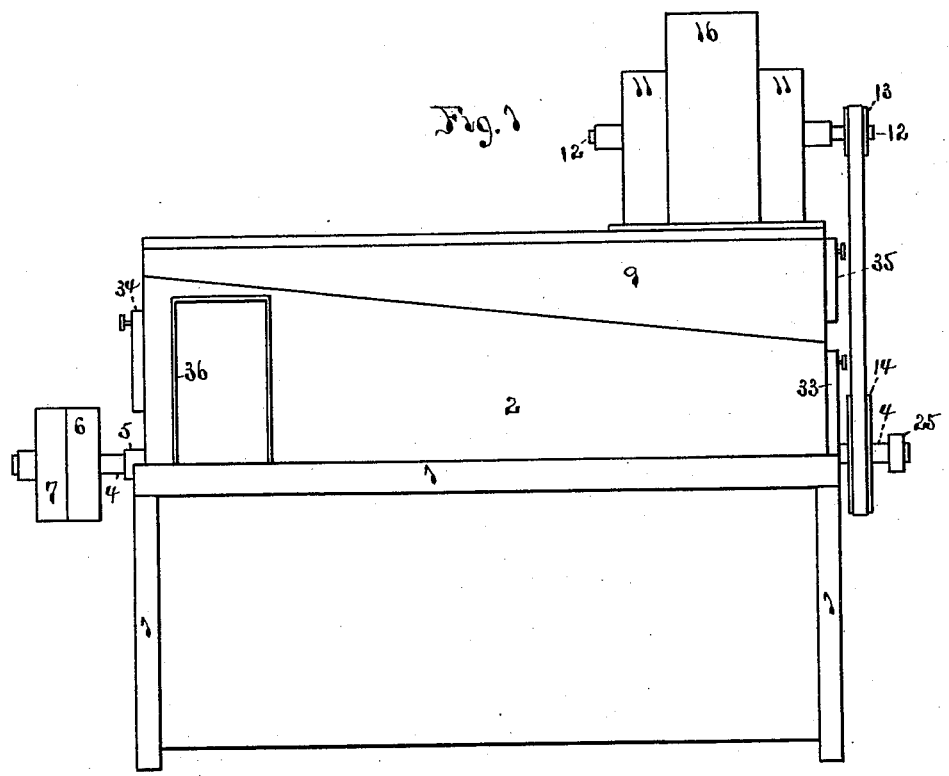
Witnesses.
Wm. B. Brown
N. P. Ockington
Inventor.
Frederick G. Sargent
By David Hartree
Atty.

(No Model.) 3 Sheets—Sheet 2.

F. G. SARGENT.
CONE DUSTER FOR FIBROUS SUBSTANCES.

No. 400,953. Patented Apr. 9, 1889.

Witnesses:
Wm. S. Brown
N. P. Ockington

Inventor:
Frederick G. Sargent
By David Hazeltine
Atty.

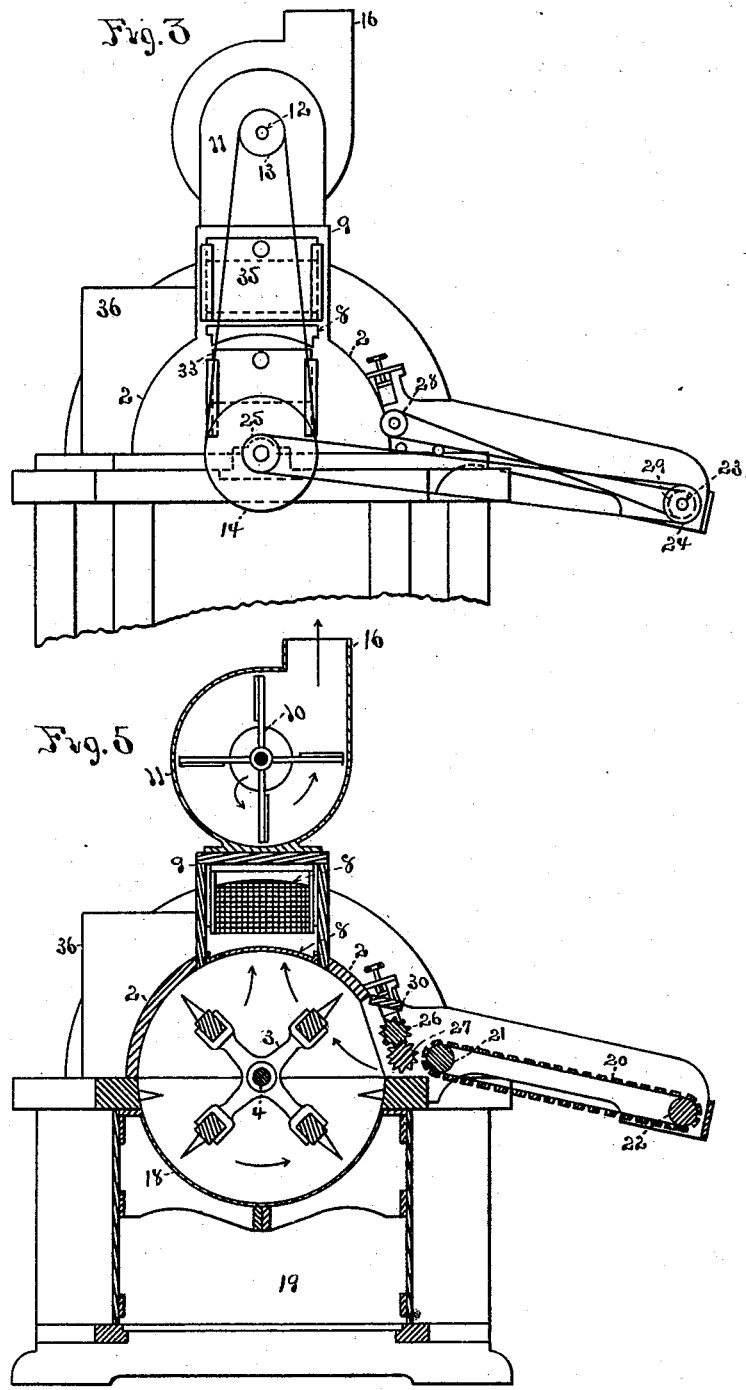

UNITED STATES PATENT OFFICE.

FREDERICK GRANDISON SARGENT, OF GRANITEVILLE, MASSACHUSETTS.

CONE-DUSTER FOR FIBROUS SUBSTANCES.

SPECIFICATION forming part of Letters Patent No. 400,953, dated April 9, 1889.

Application filed November 22, 1888. Serial No. 291,585. (No model.)

*To all whom it may concern:*

Be it known that I, FREDERICK GRANDISON SARGENT, of Graniteville, in the county of Middlesex and State of Massachusetts, have invented a certain new and useful Improvement in Cone-Dusters for Fibrous Substances, of which the following is a specification.

My invention relates to cone-dusters for separating and cleaning fibrous substances; and it consists in certain new and useful constructions and combinations of the several parts thereof, substantially as hereinafter described and claimed.

Figure 2:
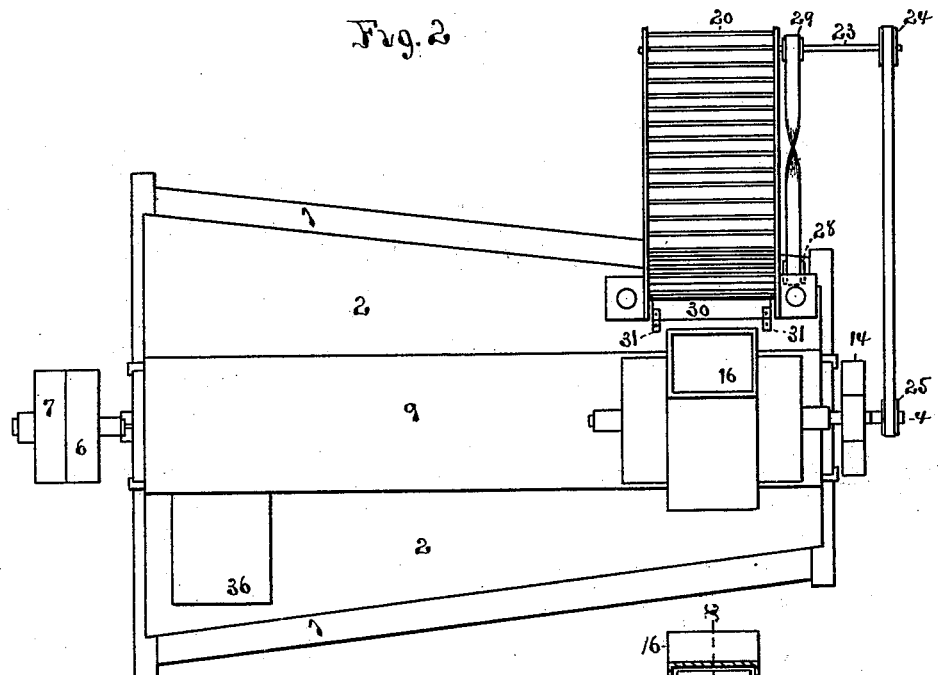
Figure 4:
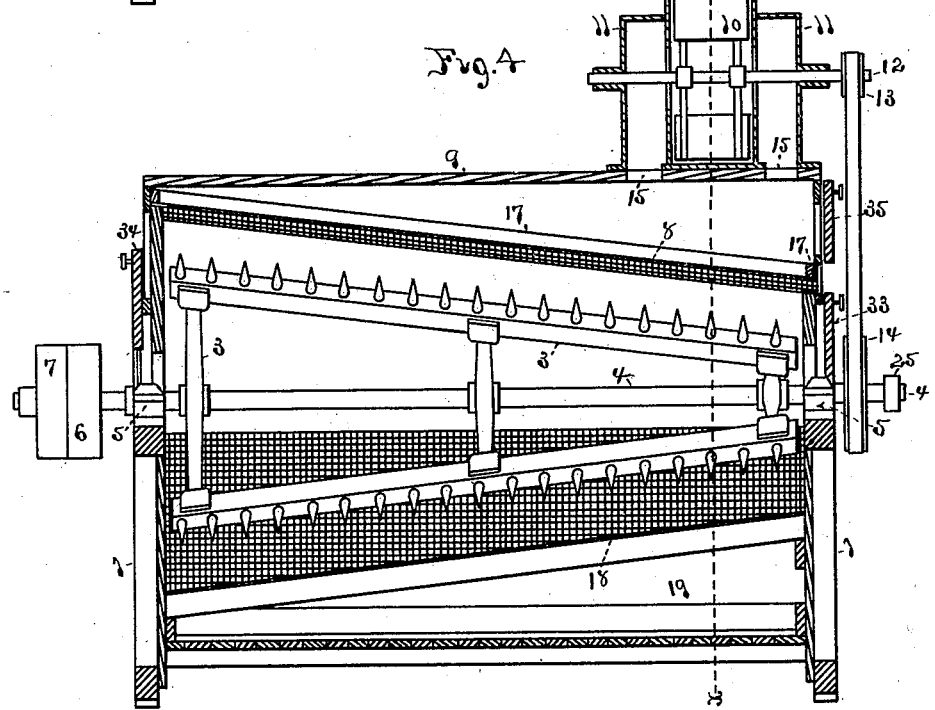

In the drawings, Figure 1 is a side elevation of a cone-duster constructed according to my invention. Fig. 2 is a top view of the same. Fig. 3 is an end elevation of the upper portion thereof. Fig. 4 is a longitudinal central vertical section. Fig. 5 is a transverse section on the dotted line *x x* of Fig. 4. Fig. 6 shows the screen over the cone-duster drawn out and separated from the latter. Fig. 7 is an end view of the same.

The frame-work of the machine, 1, supports the casing of the cone-duster, 2, which is made of the usual conical form. Within this casing the beater 3 is mounted upon the shaft 4, which shaft revolves in boxes 5 5 in the ends of its casing. The shaft 4 has mounted upon one end of it the tight and loose pulleys 6 7, by means of which it is driven from any suitable counter-shaft. The upper part of the conical cone-duster casing is cut away, so as to allow the screen 8 to be inserted therein, as shown in Figs. 4 and 5, and above the screen 8 is placed the long box or casing 9, so as to inclose the screen completely above it. On top of the box 9 is mounted a rotary suction-fan, 10, in its casing 11. The shaft 12 of the fan is mounted in boxes in the casing and extends beyond and outside of the said boxes. Upon one end of it the pulley 13 is attached, which is belted to the pulley 14 on shaft 4. Two passages, 15 15, are made through the top of the box 9 into the casing 11 of fan 10, and the fan is provided with a discharge-outlet, 16, upon its upper side. The rotation of the fan therefore exhausts the air from within the box 9 and produces a constant current or draft of air through the screen 8, by means of which the floating dust is drawn from within the casing of the cone-duster and discharged out through the delivery-passage 16 of the fan.

The screen 8 is held in a frame, 17, Fig. 6, around its outer edge, and is slipped into its place in the cone-duster through an opening in the casing at the small end of the latter, as shown in Fig. 4. It may therefore be withdrawn by pulling it out endwise through the casing, for the purpose of cleaning or repairing it, without disturbing the other parts of the machine.

The lower part of the cone-duster casing is formed of the screen 18, which allows the heavy dirt and impurities to fall downward through it into the inclosed space 19 underneath the casing of the cone-duster, from whence it may be removed in the usual manner from time to time.

In order to feed the fiber into the cone-duster, I employ the feed-apron 20, which is mounted in an extension of the frame upon one side and passes round rollers 21 22, of the usual construction, which revolve in the casing or side pieces that support the feed-apron. At the outer end of the shaft 23 of the apron-roller 22 is attached the pulley 24, by which this shaft is driven, being belted from pulley 25 on the cone-duster shaft 4. The feed-apron 20 delivers the fiber to the fluted feed-rolls 26 27, which in turn compress it between them and present it to the cone-duster 3, to be separated and opened as it is fed into the casing of the latter. The shaft of the feed-roll 26 has the pulley 28 attached to its end, which projects beyond the casing, and this pulley is belted to the pulley 29 upon shaft 23 of the apron-roller by a cross-belt, thus driving the upper feed-roll and causing the lower feed-roll, 27, to revolve by the friction of the fiber between the feed-rolls when it is passing between them.

As the cone-duster 3 strikes the fiber presented to it by the feed-rolls and opens it, the fiber tends to fly upward directly toward the nearest portions of the screen 8 and to adhere thereto, thus preventing the screen from admitting the passage of dust freely through it. In order to prevent this action of the fiber and to give it time to receive sufficient rotary motion from the cone-duster to cause it to pass through the casing of the latter to its delivery end, I provide the hinged door 30 above the feed-rolls, which can be opened to allow a current of air to pass into the casing of the cone-duster above the fiber toward the screen 8, and thus prevent the fiber from reaching the screen by the interposition of this air-current. The hinged door 30 is attached to the casing 2 of the cone-duster by hinges 31 31, as shown in Fig. 2, which allow it to be raised to admit a greater or less quantity of air, as may be desired, for the purpose mentioned.

In order to regulate the air-currents entering the cone-duster casing, I provide sliding valves or doors 33 34 at the ends of the casing, opening within the path described by the cone-duster beaters, and by raising or lowering these sliding doors the proper quantity of air is admitted within the cone-beater to overcome any partial vacuum which would be formed about its shaft by its rotation and cause the proper air-currents to flow outward from the cone-duster beater through the screen 8 and remove the floating dust, as before described. A greater or less quantity of air may also be admitted at either end by these sliding doors 33 34, and so regulate the draft of air through different parts of the screen 8 with relation to the amount of opening up which the cone-duster beater is to give the fiber before the heaviest air-currents are brought to bear upon it.

In order to further regulate the passage of the air-currents through the screen 8, I provide another sliding door, 35, at the larger end of the box 9, by the opening of which the fan will be supplied with a certain quantity of air admitted above the screen 8, and the draft of air through the latter may be diminished. These doors 33 34 35 slide up and down in the grooves of side strips or pieces attached to the end casing of the cone-duster and box 9, as shown in Fig. 3, and fit snugly enough to remain in any position to which the doors may be moved until they are again moved to a new position. It is of course understood that apertures are made in the casing of the cone-duster and box 9 in suitable positions to be covered by the sliding doors, or uncovered, as shown in Fig. 4.

The fiber which passes through the cone-duster is delivered therefrom by means of the delivery-spout 36 at the larger end thereof, in the usual manner, the fiber passing from the smaller to the larger end of the casing by means of the centrifugal force imparted to it by the cone-duster, and being thrown outward through the delivery-spout 36 by the same means.

What I claim as new and of my invention is—

The combination of the feed-rolls 26 27, the cone-duster 3, provided with the casing 2, the valve or door 30, hinged to the casing above the feed-rolls, the screen 8 above the cone-duster, its inclosure 9, and the suction-fan connected with said inclosure and adapted to create a current of air from said valve 30 through said screen and inclosure, substantially as described.

FREDERICK GRANDISON SARGENT.

Witnesses:
ARTHUR B. PLIMPTON,
HERBERT V. HILDRETH.